H. DIAMANT.
RESILIENT TIRE FOR MOTOR CARS AND OTHER VEHICLES.
APPLICATION FILED MAY 7, 1914.
1,110,750. Patented Sept. 15, 1914.
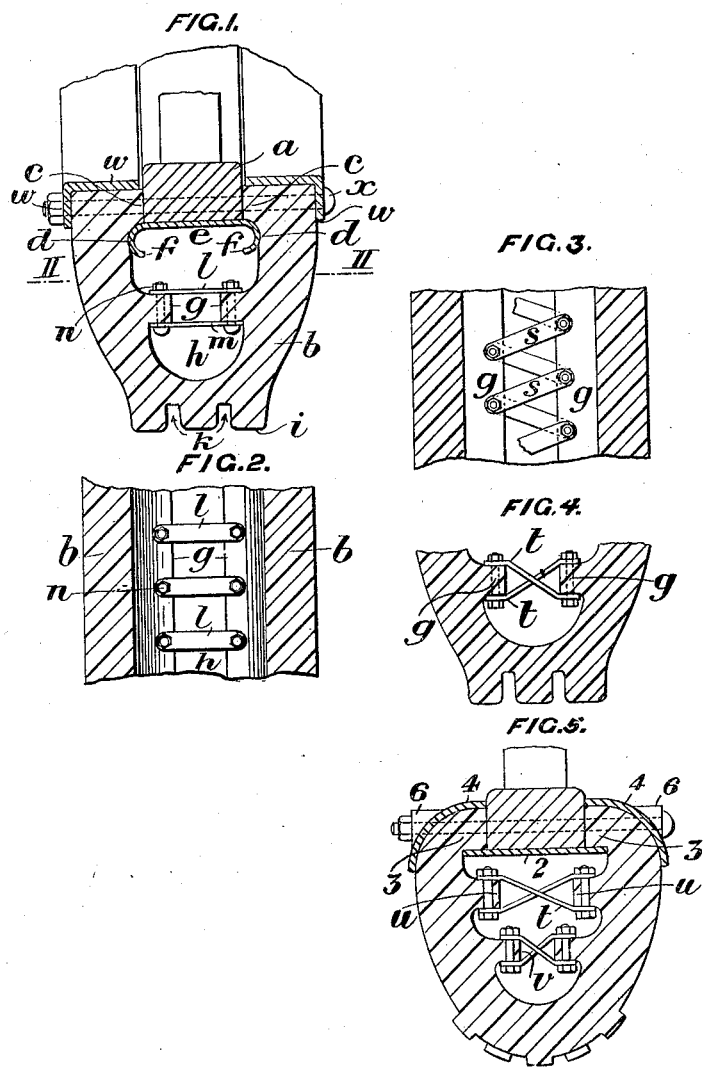

UNITED STATES PATENT OFFICE.

HERMAN DIAMANT, OF COUNTY OF MIDDLESEX, ENGLAND.

RESILIENT TIRE FOR MOTOR-CARS AND OTHER VEHICLES.

1,110,750.  Specification of Letters Patent.  Patented Sept. 15, 1914.

Application filed May 7, 1914. Serial No. 836,953.

*To all whom it may concern:*

Be it known that I, HERMAN DIAMANT, subject of the King of Great Britain, and residing at No. 14, Westbourne Terrace, road, in the county of Middlesex, England, have invented new and useful Improvements in Resilient Tires for Motor-Cars and other Vehicles, of which the following is a specification.

This invention relates to improvements in resilient tires for motor cars and other vehicles, such tires being of the hollow or arched cushion type and filled with air which is not necessarily under pressure and in which the sides of the tire are either tied together at a place between the tread and the rim or felly to prevent collapse of the tire outwardly or are provided with struts at that place to prevent collapse inwardly.

According to this invention the tire which is preferably made more or less in the form of an arch in cross section is provided internally with an annular projecting flange or flanges on opposite sides, the two flanges of a pair being connected together by links, so as to prevent or reduce any tendency for the tire to collapse externally or internally or to otherwise become unduly deformed under a load. The tire is conveniently held fast or clamped to the rim or felly of the wheel by known means, such as annular angular clamping plates or rings and bolts or otherwise.

Figure 1 of the accompanying drawings is a vertical section through a tire constructed according to this invention and Fig. 2 is a plan section on the line II—II of Fig. 1. Fig. 3 is a plan section showing the links arranged zig-zag; Fig. 4 is a part vertical section showing the links crossing one another and Fig. 5 is a vertical section of another construction of tire and arrangement of link.

In carrying the invention into effect and according to one construction as shown in Figs. 1 and 2, the felly or rim $a$, which may be of wood, is flat on its outer periphery and the tire $b$ which is more or less trough shaped in cross section has in the region of its inner periphery two annular inwardly projecting beads $c$, each of which is adapted to seat itself against the side of the felly $a$. The outer peripheries of the beads $c$ merge into an annular part-circular recess $d\ d$ in each wall of the tire $b$ into which recesses takes an annular band $e$ with rounded or turned-over flanges or edges $f$ of known construction, the said band $e$ being of such an internal diameter as to just fit on the outer periphery of the felly $a$ and it may either be fixed to the felly as usual or it may be loose thereon. Below the annular part circular recesses $d$ are two annular internally projecting flanges $g\ g$ somewhat closer together than the said annular beads and below these annular flanges $g$ is an annular trough or recess $h$ of more or less semi-circular cross section, the thickness of the rubber or other material below this trough forming the tread $i$ of the tire, which tread may have annular grooves $k\ k$, as shown or it may be semi-circular and provided with studs or projections or the tread may have transverse bars or be fashioned in any other suitable or well known manner. The flanges $g\ g$ are provided with a number of holes, radial to the axis of the wheel, and the opposite flanges $g\ g$ are connected together by a number of pairs of straight flat metal links $l$ and $m$ and bolts $n$, one link $l$ of a pair being above and the other link $m$ being below the flanges so that the two links of a pair are fastened together and to the flanges by the bolts or screws $n\ n$. The links $l$ and $m$ are parallel to the felly $a$, the bolts $n$ are suitably passed through a lower link $m$, then through the holes in the annular flanges $g$ through the corresponding upper link $l$ and finally the nuts are screwed up tightly but obviously the bolts may be replaced by screws which are first passed through the links $l$ then through the holes in the flanges and finally screwed into screw-threaded holes in the links $m$. Or as shown in Fig. 3 the links $s$ may if desired be connected to the flanges $g$ in such a manner as to be arranged zig-zag crossing each other in approximately the same peripheral plane. Or as illustrated in Fig. 4, one end of a link $t$ is fastened to the top of a flange $g$, while the other end of the link may be fixed below to the opposite flange. Moreover according to another construction and as shown in Fig. 5, there may be two concentric flanges $u$ and $v$ on each side of the interior of the tire, the opposite flanges of a pair being connected by crossed links $t$.

The flanges are preferably but not necessarily reinforced with canvas or insertion and the holes in the flanges may be lined or bushed with metal. The tire is suitably held fast or clamped to the rim or felly of the wheel as shown in Fig. 1 by means of annular clamping plates $w$ and bolts $x$ which pass through holes in the clamping plates $w$, the sides of the tire $b$ and the felly $a$ so as to clamp the beads $c$ of the tire against the sides of the felly and the part circular recesses $d$ against the turned-over flanges or edges $f$ of the annular band $e$.

The method of fixing the tire to the felly shown in Fig. 5 somewhat resembles the arrangement shown in Fig. 1, but in this case the band 2 next to the felly is flat instead of having turned over flanges, the sides of the tire have inwardly projecting beads 3 with curved outer surfaces, the clamping plates 4 are also curved and perforated to take bolts 5, the heads and nuts of which take against lugs or loose washers 6 shaped to conform to the curve of the clamping plates.

I claim—

1. A hollow resilient tire provided on each inner side with an annular radially perforated projecting flange, the two flanges being connected by rigid links and bolts said bolts passing through the links and the holes in the flanges.

2. A hollow resilient tire having an annular projecting flange on each inner side, and links fastened on the outer side of one flange and on the inner side of the other flange.

HERMAN DIAMANT.

Witnesses:
H. D. JAMIESON,
W. E. ROGERS.

---

Copies of this patent may be obtained for five cents each, by addressing the "Commissioner of Patents, Washington, D. C."